1,908,015

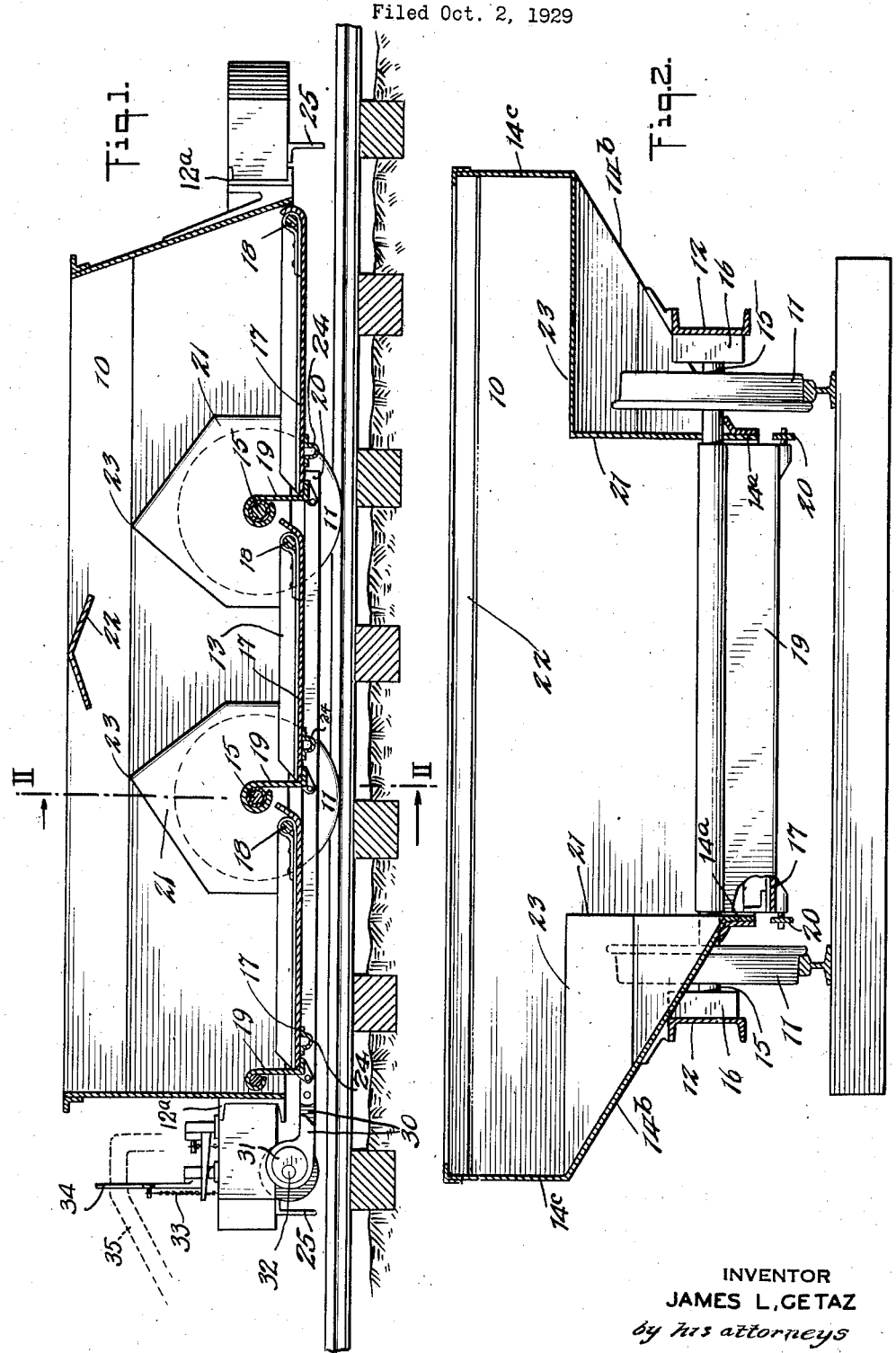
May 9, 1933.    J. L. GETAZ    1,908,015
DUMP CAR
Filed Oct. 2, 1929
INVENTOR
JAMES L. GETAZ
by his attorneys
Howson and Howson Patented May 9, 1933

UNITED STATES PATENT OFFICE

JAMES L. GETAZ, OF MARYVILLE, TENNESSEE, ASSIGNOR TO HUGH W. SANFORD, OF KNOXVILLE, TENNESSEE

DUMP CAR

Application filed October 2, 1929. Serial No. 396,752.

My invention relates to dump cars, and particularly such cars as are used in mines wherein loose material is carried from a point of loading to another point where it is automatically dumped.

Among the objects of my invention may be mentioned the provision of a dump car having a maximum capacity outside of the rails which will, at the same time, be of low height and self-dumping. A further object is the construction of such a car in a manner which will make possible the dumping of all of the material in the car. Other objects will later appear.

The invention is illustrated by way of example, in the accompanying drawing, in which Figure 1 is a longitudinal mid-section of a car constructed in accordance with the invention, and Fig. 2 is a section on the line II—II of Figure 1.

In order to accomplish the purposes of the invention, the side beams forming the main supporting frame for the car are placed outside of the wheels and the sides of the car are sloped upward and outward resting upon the side beams. The car bottom consists of pivoted dumping sections or doors which extend transversely substantially the entire distance between the wheels. To cover the wheels, portions of the car sides are formed as hoods with perpendicular faces. Means are also provided for dumping the sections of the car bottom.

In the embodiment illustrated in the drawing there is shown a dump car 10 comprising wheels 11, side beams or sills 12 outside of the wheels with their ends jointed by sills 12a and a dumping bottom 13 between the wheels. The sides of the car extend from the bottom upwardly and outwardly past the side beams 12 and are supported thereby. These sides have vertical portions 14a inside the wheels, from the upper edges of which side wing portions slope upward and outward forming stationary wing bottoms 14b to the side wing portions sloped at an angle greater than the angle of repose of loose coal, and from the outer edges of the wing bottoms 14b, upright side portions 14c extend. The wheels 11 may be mounted upon axles 15 as is usual in such constructions, and the axles may rotate in journal boxes 16 carried by the side beams or sills 12.

The dumping bottom is preferably composed of independent sections 17 forming dumping doors lying wholly between the wheels, and these sections may be hinged as at 18 on transverse pivots to swing downwardly when dumping in accordance with my copending patent application Serial No. 385,492 filed August 13th, 1929.

I may also provide latches 19 which are adapted to hold the bottom sections 17 in loading position, and these latches may be hinged and adapted to hold the sections in position by supporting the free ends thereof (see Figure 1). I may likewise provide a longitudinally movable controller or side bar 20 connecting all of the latches 19. Such latches and such a controller or side bar are described and illustrated in my copending patent application, above identified. As set forth therein, the side bars 20 have their rearward ends pivotally connected with connecting bars 30, each of which has an eye formed therein surrounding an eccentric 31. The eccentrics 31 are mounted on a shaft 32, so that upon turning of the shaft, the connecting bars 30 are moved longitudinally of the car to provide longitudinal movement for the side bars 20. In order to turn the shaft 32, I have shown a chain 33 extending at least partly therearound and connected with a lever or latch bar 34, pivoted at one end and adapted to have its other end raised by a cam 35 placed adjacent the track, so that upon actuation of the lever 34, the side bars 20 are moved rearwardly, longitudinally of the car, to swing the latches 19 back away from engagement with the free edges of the doors and allow the doors to drop.

Portions of the car sides are formed to cover the wheels, and I prefer to provide dormer-shaped hood portions 21 for this purpose: that is to say, hood portions which extend upwardly from the sloping car sides 14 in the same manner as that in which a dormer-window extends above a sloping roof and which form hood-coverings over the wheels. In general the car will have two wheels on each side, and I will, therefore, provide a pair of dormer-shaped hood portions 21 in each side covering the wheels. The dormer shaped portions are preferably ridged as at 23 and have surfaces extending downward from the ridge at angles which are greater than the angle of repose of the material which the car is being designed to carry.

A transverse bracing beam 22 is preferably provided extending from one side of the car to the other, in order to brace the car sides 14, and prevent them from bulging under load. The bracing beam is disposed mid-way between the dormer-shaped portions on each side of the car as best illustrated in Fig. 1. It is desirable to position the bracing beam 22 at a lesser distance from the ridges of the dormers 21 than the shortest distance between two adjacent dormers. Where the bracing beam and dormer portions are so disposed, lumps of material which would not pass freely between the dormers on each side will not pass between the dormer portions and the bracing beam. When the car is dumped, material coming between the formers will not choke this constricted opening, but will slide freely down the side and out of the car. Such material as will not pass between the bracing beam and the dormer will slide forwardly or rearwardly where there is more room and will not remain between constricted portions of the car side after the car has been dumped. In order that the bracing beam may function as described, and in order that it may not allow coal to remain upon its upper surface I may employ an obtuse angle shape as the bracing beam, the angle pointing upward as a ridge across the car.

Angle guards 25 may be fastened under the bumpers at each end of the car to remove from the track obstructions which might strike the doors or latches. Obviously the shape of these angle guards may be altered from that illustrated.

Further, there may be riveted near the free end of each bottom section 17 a projecting piece 24, which extends downwardly from the section and is rounded on its under side. Thus the projecting pieces 24 are positioned just in front of the latches 19 and prevent obstructions from striking the latches and dumping the car. When the doors are closed by sliding over a replacing rail as described in my copending patent application above mentioned, the free ends of the sections 17 are raised a short distance above the latches, and there need be no pressure between the replacing rail and the hinge of the section.

The reference in the claims to "standard track rails" or the equivalent is intended to refer to the rails of the track which runs throughout the workings where the car is used.

I claim:

1. A dump car comprising axles, wheels upon said axles, side beams outside of said wheels, a dumping bottom composed of sections between the wheels, and sides supporting said bottom inside the wheels and extending upwardly and outwardly from said bottom past said beams supported by the latter, portions of said sides being formed to cover said wheels.

2. In a dump car, wheels, side beams disposed outside of said wheels, a dumping bottom composed of sections lying wholly between said wheels, sides of said car extending upwardly and outwardly past said beams and supported thereby, and dormer-shaped portions of said sides formed to cover said wheels.

3. In a dump car, wheels, side beams disposed outside of said wheels, a dumping bottom composed of sections lying wholly between said wheels, sides of said car extending upwardly and outwardly past said beams and supported thereby, and a pair of dormer-shaped portions in each side covering the wheels, in combination with a bracing beam extending from one side to the other mid-way between the units of each pair of dormer-shaped portions.

4. In a dump car, wheels, side beams disposed outside of said wheels, a dumping bottom composed of sections lying wholly between said wheels, sides of said car extending upwardly and outwardly past said beams and supported thereby, and a pair of dormer-shaped portions in each side covering the wheels, in combination with a bracing beam extending from one side to the other mid-way between the units of each pair of dormer-shaped portions at a lesser distance from the ridges of the dormers than the shortest distance between two adjacent dormers, substantially as described.

5. In a dump car, wheels, side beams disposed outside of said wheels, independent sections forming a dumping bottom between the wheels, latches adapted to hold said sections in loading position, and a controller bar connecting all of the latches, in combination with sides extending upwardly and outwardly from said bottom past said beams and supported by the latter.

6. In a dump car, wheels, side beams disposed outside of said wheels, independent hinged sections forming a dumping bottom between the wheels, hinged latches adapted to hold said sections in loading position by supporting their free ends, and a controller bar connecting all of the latches, in combination with sides extending upwardly and outwardly from said bottom past said beams and supported by the latter, substantially as described.

7. In a dump car, wheels, side beams disposed outside of said wheels, a dumping bottom composed of sections lying wholly between said wheels, sides of said car extending upwardly and outwardly past said beams and supported thereby, and dormer-shaped portions of said sides formed to cover said wheels, said dormer-shaped portions being ridged and having surfaces extending downward from the ridge at angles greater than the angle of repose of the material which the car is designed to carry.

8. In a dump car, the combination of wheels, side beams supported by the wheels, side walls carried by the side beams, independent sections forming a dumping bottom between the wheels and hinged about axes extending transversely of the car, latches adapted to hold said sections in loading positions, and a longitudinally movable controller-bar connecting all of said latches together.

9. In a four-wheel drop-bottom coal mining or similar rail car with a lading body having a central portion and side wing-portions, and with stationary lading bottoms to the side wing-portions, which bottoms are sloped for the discharge of the lading through openings made by the dropping of the bottom doors and for discharge between track rails, the combination of car wheels projecting deeply into the said side wing-portions of the lading body and deeply recessed wheel hood-coverings over the tops of the wheels, a plurality of drop bottom doors, the said hood-coverings being sloped so as not to prevent the discharge of the lading through the dropped bottom doors, latches for controlling the release of the doors, and a longitudinally movable controller bar for controlling the release of the latches.

10. In a four-wheel drop-bottom coal mining or similar rail car with a lading body having a central portion and side wing-portions, and with stationary lading bottoms to the side wing-portions, which bottoms are sloped for the discharge of the lading through openings made by the dropping of the bottom doors and for complete discharge between standard track rails, the combination of car wheels projecting deeply into the said side-wing portions of the lading body and deeply recessed wheel hood-coverings over the tops of the wheels, a plurality of drop bottom doors, the said hood-coverings being sloped so as not to prevent the discharge of the lading through the dropped bottom doors, and the inside walls of the wheel hood-coverings extending substantially to the upright plane of the adjacent outside edges of the drop doors, latches for controlling the release of the doors, and a longitudinally movable controller bar for controlling the release of the latches.

11. In a four-wheel drop-bottom coal mining or similar rail car with a lading body having a central portion and side wing-portions, and with lading bottoms to the side wing-portions, which bottoms are sloped for the discharge of the lading through openings made by the dropping of the bottom doors and for complete discharge between the track rails, the combination of car wheels projecting deeply into the side wing-portions of the lading body and deeply recessed wheel hood-coverings over the tops of the wheels, a plurality of drop-bottom dumping doors, the said hood-coverings being sloped so as not to prevent the discharge of the lading through the dropped bottom doors, together with stiff endwise lading body supporting members outside the wheels, and axle spindles associated with the said endwise members and supporting them.

12. A dump car comprising wheels, side beams outside of said wheels, sides supported by said beams and extending downwardly to points inside the wheels, a dumping bottom composed of sections carried by said sides inside the wheels, latches for the sections, and a longitudinally movable bar connecting a plurality of said latches together.

13. In a drop-bottom rail car with a lading body having a central portion and side wing-portions, the combination of car wheels, car axles, a plurality of drop doors transversely hinged and located at least in substantial part below the horizontal plane of the axes of the car wheels, stationary lading bottoms to the side wing-portions on slopes which start from below the horizontal plane of the tops of the car axles whereby the lading is discharged through openings made by the dropping of the bottom doors, and for complete discharge between the standard track rails, the car wheels projecting deeply into said side wing-portions of the lading body, and deeply recessed wheel hood coverings over the tops of the wheels, said hood-coverings being sloped so as not to prevent the discharge of the lading through the dropped bottom doors.

14. In a mine or other rail car, the combination of car axles, car wheels, a lading body having a plurality of transverse drop doors pivotally hinged at their forward ends and latched releasably at their rearward ends, the body being in hopper-form and constructed for a complete discharge of the lading by gravity between the standard track rails through the dropped bottom doors, said drop doors having bottoms located at least in substantial part below the horizontal plane of the axes of the car wheels, and lading wing-bottoms extending outwardly from inside the rails and from a level below the horizontal plane of the tops of the car axles and in planes cutting the adjacent car wheels substantially below their uppermost tread lines.

15. In a mine or other rail car, the combination of car axles, car wheels, a lading body having a plurality of transverse drop doors pivotally hinged at their forward ends and latched releasably at their rearward ends, the body being in hopper-form and constructed for a complete discharge of the lading by gravity between the standard track rails through the dropped bottom doors, said drop doors having bottoms located at least in substantial part below the horizontal plane of the axes of the car wheels, and lading wing-bottoms extending outwardly from inside the rails and from a level below the horizontal plane of the tops of the car axles and in planes cutting the adjacent car-wheels substantially below their uppermost tread lines, said car having a substantially rectangular sill-frame with longitudinal side sill-members located outside the car wheels and at the level of the axes of the car-wheels.

16. In a mine or other rail car, the combination of car axles, car wheels, a lading body having a plurality of transverse drop doors pivotally hinged at their forward ends and latched releasably at their rearward ends, the body being in hopper-form and constructed for a complete discharge of the lading by gravity between the standard track rails through the dropped bottom doors, said drop doors having bottoms located at least in substantial part below the horizontal plane of the axes of the car wheels, and lading wing-bottoms extending outwardly from inside the rails and from a level below the horizontal plane of the tops of the car axles and in planes cutting the adjacent car wheels substantially below their uppermost tread lines, said car having a substantially rectangular sill-frame with longitudinal side sill-members located outside the car wheels and at the level of the axes of the car wheels, each lading wing-bottom connecting with a substantially upright lower side section, the line of connection being below the horizontal plane of the tops of the car axles and said upright section being in close sealing relationship with the edges of the drop bottom doors.

17. In a mine or other rail car, the combination of car axles, car wheels, a lading body having a plurality of transverse drop bottom doors pivotally hinged at their forward ends and supported releasably at their rearward ends and located at least in substantial part below the horizontal plane of the axes of the car wheels, a lever bar mechanism at the rear end of the lading body of the car and operable from the side of the car, latch supports for each of the doors, a connecting bar associating the lever-bar mechanism mechanically with the rearward door, a longitudinally movable side bar associating the connecting bar with each forward door whereby a movement of the lever bar releases the rearward door for dropping and also induces a longitudinal movement of the side bar which in turn causes a releasing movement of the latch supports for each forward door whereby each said door is released for dropping, the lading body having stationary wing-bottoms at an angle for the discharge of the lading between the track rails and lying in planes cutting the adjacent car wheels well below the top lines of the treads.

18. In a mine or other rail car, the combination of car axles, car wheels, a lading body having a plurality of transverse drop bottom doors pivotally hinged at their forward ends and supported releasably at their rearward ends and located at least in substantial part below the horizontal plane of the axes of the car wheels, a lever bar mechanism at the rear end of the lading body of the car and operable from the side of the car, latch supports for each of the doors, a connecting bar associating the lever bar mechanism mechanically with the rearward door, a longitudinally movable side bar associating the connecting bar with each forward door whereby a movement of the lever-bar releases the rearward door for dropping and also induces a longitudinal movement of the side bar which in turn causes a releasing movement of the latch supports for each forward door whereby each said door is released for dropping, the lading body having stationary wing-bottoms at an angle for the discharge of the lading between the track rails and lying in planes cutting the adjacent car wheels well below the top lines of the treads, and a substantially rectangular sill frame at the level of the axes of the car wheels having longitudinal side sill-members located outside the car wheels.

19. In a mine or other rail car, the combination of car axles, car wheels, a lading body having a plurality of transverse drop bottom doors pivotally hinged at their forward ends and supported releasably at their rearward ends and located at least in substantial part below the horizontal plane of the axes of the car wheels, a lever bar mechanism at the rear end of the lading body of the car and operable from the side of the car, latch supports for each of the doors, a connecting bar associating the lever bar mechanically with the rearward door, a longitudinally movable side bar associating the connecting bar with each forward door whereby a movement of the lever bar releases the rearward door for dropping and also induces a longitudinal movement in the side bar which in turn causes a releasing movement of the latch supports for each forward door whereby each said door is released for dropping, the lading body having stationary wing-bottoms at an angle for the discharge of loose coal or other loose lading between the track rails and lying in planes cutting the adjacent car wheels well below the top lines of the treads, and a substantially rectangular sill frame at the level of the axes of the car wheels having longitudinal side sill-members located outside the car wheels, and deep wheel hood-coverings attached to the said lading bottom.

20. In a mine or other rail car, the combination of car axles, car wheels, a lading body having a plurality of transverse drop bottom doors pivotally hinged at their forward ends and supported releasably at their rearward ends and located at least in substantial part below the horizontal plane of the axes of the car wheels, a lever-bar mechanism at the rear end of the lading body of the car and operable from the side of the car, latch supports for each of the doors, a connecting bar associating the lever bar mechanism mechanically with the rearward door, a longitudinally movable side bar associating the connecting bar with each forward door whereby a movement of the lever-bar releases the rearward door for dropping and also induces a longitudinal movement of the side bar which in turn causes a releasing movement of the latch supports for each forward door whereby each said door is released for dropping, the lading body having stationary wing-bottoms at an angle for the discharge of loose coal or other loose lading between the track rails and lying in planes cutting the adjacent car wheels well below the top lines of the treads, and a substantially rectangular sill frame at the level of the axes of the car wheels having longitudinal side sill-members located outside the car wheels, and deep wheel hood coverings attached to the said wing-bottoms, each lading wing-bottom having a substantially upright lower section located below the horizontal plane of the tops of the car axles and in close sealing relationship with the sides of the drop bottom doors.

21. In a drop bottom mine or other rail car, the combination of car wheels, car axles, a lading body of hopper-shape constructed for the complete discharge of lading between the rails, a plurality of transverse drop doors pivotally hinged at their forward ends and located at least in substantial part below the horizontal plane of the axes of the car wheels, a longitudinal lading body wing-bottom extending laterally on a rising slope starting from inside the rails at a level that is below the horizontal plane of the tops of the car axles and continuing in a plane that cuts the adjacent car wheels substantially below their uppermost tread lines, and deep hood-coverings over the car wheels.

22. In a drop bottom mine or other rail car, the combination of car wheels, car axles, a lading body of hopper-shape constructed for the complete discharge of the lading between standard track rails, a plurality of transverse drop doors with their longitudinal edges lying between the opposed car wheels and located at least in substantial part below the horizontal plane of the axes of the car wheels, longitudinal load-supporting side sill-members outside the track lines and at the level of the horizontal plane of the axes of the car wheels, and transverse traction structures at each end of the lading body of the car extending from one side sill-member to the other and rigidly attached thereto.

23. In a mine or other rail car, the combination of car axles, car wheels, a lading bottom having a plurality of transverse drop doors pivotally hinged at their forward ends and located at least in part below the horizontal plane of the axes of the car wheels, latch mechanisms for releasing each of the rear ends of the doors for dropping, and said latch mechanism for a forward door being constructed to operate in the direction of the length of the car lever bar means operable from the side of the car and connected mechanically with the latch mechanisms whereby a movement of the lever bar releases all of the doors for dropping simultaneously, the lading body having stationary wing-bottoms at an angle for the discharge of the lading between the track rails and lying in planes cutting the adjacent car wheels well below the top lines of the treads.

24. In a mine or other rail car, the combination of car axles, car wheels, a lading bottom having a plurality of transverse drop doors pivotally hinged at their forward ends and located in part below the horizontal plane of the axes of the car wheels, latch mechanisms for releasing each of the rear ends of the doors for dropping, and said latch mechanism for a forward door being constructed to operate in the direction of the length of the car lever bar means operable from the side of the car and connected mechanically with the latch mechanisms whereby a movement of the lever bar means releases all the doors for dropping in any pre-arranged order and without longitudinal motion of the doors on their pivotal supports, the lading body having stationary wing-bottoms at an angle for the discharge of the lading between the track rails and lying in planes cutting the adjacent car wheels well below the top lines of the treads.

25. In a mine or other rail car, the combination of car axles, car wheels, a lading bottom having a plurality of transverse drop doors pivotally hinged at their forward ends and located in part below the horizontal plane of the axes of the car wheels, latch mechanisms for releasing each of the rear ends of the doors for dropping, and said latch mechanism for a forward door being constructed to operate in the direction of the length of the car, lever bar means operable from the side of the car and connected mechanically with the latch mechanisms whereby a movement of the lever bar means releases all the doors for dropping before the rear end of any one door has dropped below the lowest part of the structure of the lading body, the lading body having stationary wing-bottoms at an angle for the discharge of the lading between the track rails and lying in planes cutting the adjacent car wheels well below the top lines of the treads.

26. In a mine or other rail car, the combination of car axles, car wheels, a lading bottom having a plurality of transverse drop doors pivotally hinged at their forward ends and located in part below the horizontal plane of the axes of the car wheels, latch mechanisms for releasing the rear end of each of the doors for dropping, and said latch mechanism for a forward door being constructed to operate in the direction of the length of the car, lever bar means operable from the side of the car and connected mechanically with the latch mechanisms whereby a movement of the lever bar means releases all the doors for dropping before the rear end of any one door has dropped below the lowest part of the structure of the lading body and without longitudinal motion of the pivot points of the doors, and the lading body having stationary wing-bottoms at an angle for the discharge of the lading between the track rails and lying in planes cutting the adjacet car wheels well below the top lines of the treads.

27. In a mine or other rail car, the combination of car axles, car wheels, a lading bottom having a plurality of transverse drop doors pivotally hinged at their forward ends and latched releasably at their rearward ends, the body being in hopper-form and constructed for a complete discharge of the lading by gravity between the rails and on both sides of each axle of the car, said drop doors having bottoms located at least in substantial part below the horizontal plane of the axes of the car wheels, latch releasing mechanisms for all of the doors, said mechanism for a forward door being constructed to operate in the direction of the length of the car, a lever bar controlling the latch releasing mechanisms, the doors being released by a movement of the lever bar whereby all doors may be simultaneously released for dropping, the lading body having stationary wing-bottoms at an angle for the discharge of the lading between the track rails and lying in planes cutting the adjacent car wheels well below the top lines of the treads.

28. In a mine or other rail car, the combination of car axles, car wheels, a lading bottom having a plurality of transverse drop doors pivotally hinged at their forward ends and latched releasably at their rearward ends, the body being in hopper-form and constructed for a complete discharge of the lading by gravity between the rails and on both sides of each axle of the car, said drop doors having bottoms located at least in substantial part below the horizontal plane of the axes of the car wheels, latch releasing mechanisms for all of the doors, said mechanism for a forward door being constructed to operate in the direction of the length of the car, a lever bar controlling the latch releasing mechanisms, the doors being released by a movement of the lever bar whereby all doors may be simultaneously released for dropping, the lading body having stationary wing-bottoms at an angle for the discharge of the lading between the track rails and lying in planes cutting the adjacent car wheels well below the top lines of the treads, the doors being released for dropping without longitudinal motion of any of the pivots of the doors.

29. In a mine or other rail car, the combination of car axles, car wheels, a lading body, longitudinal sill-members having upright sections substantially at the level of the horizontal plane of the axes of the wheels, a plurality of transverse drop doors pivotally hinged at their forward ends and located at least in part below the plane of the axes of the wheels, latch mechanisms for releasing the rear end of each of the doors for dropping, longitudinally movable means located beneath the car axles and extending substantially from the rear end of the lading body of the car forward and associated with said latch mechanisms of the forward doors whereby a longitudinal movement of the said movable means serves to release for dropping each door forward of the rearward door, and lever means operable from the side of the rear end of the car whereby its operation creates a longitudinal movement in the said movable means, the lading body having stationary wing-bottoms at an angle for the discharge of the lading between the track rails and lying in planes cutting the adjacent car wheels well below the top lines of the treads.

30. In a mine or similar rail car, the combination of car wheels, car axles, a lading body, transverse bumper sills at each end of the lading body, and extending past the track gauge lines, a plurality of transversely hinged drop doors arranged for the complete discharge of the lading load between the track rails and on both sides of each car axle, the doors being located at least in substantial part below the horizontal plane of the axes of the wheels, a stationary sloping lading body wing-bottom extending transversely from inside track rail to a point outside the rail and the said wing bottom lying in a plane cutting the adjacent car wheels below their top tread lines and being supported at least in part outside said track rail by the extension of the bumper sills.

31. In a drop bottom rail car with a lading body having a central portion and side wing-portions, the combination of car wheels, car axles, a plurality of drop doors hinged transversely of the lading body and having bottoms located at least in substantial part below the horizontal plane of the axes of the car wheels, stationary lading bottoms to the side wing-portions on slopes arranged for discharge of lading by gravity through openings made by the dropping of the bottom doors and for complete discharge between standard track rails, longitudinal load-supporting sill-members with substantially upright sections approximately at the level of the horizontal plane of the axes of the car wheels, deeply recessed hood-coverings over the tops of the car wheels, the transverse walls of the said hood-coverings extending downwardly to a level which is below the level of the horizontal plane of the tops of the said upright sections of the sill-members.

32. In a drop bottom rail car with a lading body having a central portion and side wing-portions, the combination of car wheels, car axles, a plurality of drop doors hinged transversely of the lading body and having bottoms located at least in substantial part below the horizontal plane of the axes of the car wheels, stationary lading bottoms to the side wing-portions extending over the wheels to points inside the wheels and arranged on slopes arranged for discharge of lading by gravity through openings made by the dropping of the bottom doors and for complete discharge between standard track rails, longitudinal load-supporting sill-members with substantially upright sections approximately at the level of the horizontal plane of the axes of the car wheels, deeply recessed hood-coverings attached to the wing portions over the tops of the car wheels, the transverse walls of the said hood-coverings extending downwardly to a level which is below the level of the horizontal plane of the tops of journals of the car axles.

33. In a drop bottom rail car with a lading body having a central portion and side wing-portions, the combination of car wheels, car axles, a plurality of drop doors hinged transversely of the lading body and having bottoms located at least in substantial part below the horizontal plane of the axes of the car wheels, stationary lading bottoms to the side wing-portions on slopes arranged for discharge of lading by gravity through openings made by the dropping of the bottom doors and for complete discharge between standard track rails, longitudinal load-supporting sill-members, and deeply recessed hood-coverings over the tops of the car wheels, the transverse walls of the said hood-coverings extending downwardly to a level which is below the level of the horizontal plane of the tops of journals of the car axles.

34. In a drop bottom rail car with a lading body having a central portion and side wing-portions, the combination of car wheels, car axles, a plurality of drop doors hinged transversely of the lading body and having bottoms located at least in substantial part below the horizontal plane of the axes of the car wheels, stationary lading bottoms to the side wing-portions on slopes arranged for discharge of lading by gravity through openings made by the dropping of the bottom doors and for complete discharge between standard track rails, and deeply recessed hood-coverings over the tops of the car wheels, the transverse walls of the said hood-coverings extending downwardly to a level which is below the level of the horizontal plane of the tops of journals of the car axles.

35. In a four-wheel drop-bottom coal mining rail car with a lading body having a central portion and side wing portions, and with stationary lading bottoms to the side wing portions, said bottoms being so sloped as to freely discharge loose coal by gravity through openings made by the dropping of bottom doors and for discharge between track rails, the combination of car wheels projecting so deeply into recesses in the side wing portions that the upper wheel tread surfaces as disclosed in vertical cross-sections of the wheels are entirely buried within said recesses.

In testimony whereof I have signed my name to this specification.

JAMES L. GETAZ.